INVENTOR
P. C. RICHARDS
BY Daniel E. Nester
ATTORNEY

United States Patent Office 3,525,817
Patented Aug. 25, 1970

3,525,817

COMMUNICATION SYSTEM CALL TREATMENT SELECTION METHOD AND APPARATUS

Philip C. Richards, Geneva, Ill., assignor to Bell Telephone Laboratories, Incorporated, Murray Hill, N.J., a corporation of New York Filed June 25, 1968, Ser. No. 739,814
Int. Cl. H04m 3/38
U.S. Cl. 179—18 9 Claims

ABSTRACT OF THE DISCLOSURE

Disclosed are a method and apparatus for the selection of routing and charging treatments to be given call requests by a communication switching office. Selection is made on the basis of a requested call destination and the class of service of the line initiating the request. All the information codes defining call destinations are organized into code sets according to basic categories of call treatment for various classes of service. These sets are numbered and each is assigned numbered boundaries. For each class of service, the code set boundaries which define divisions between the various categories of call treatment available for that class of service are defined with respect to the numbers of the appropriate information code sets. The numerical relationship between the call treatment category boundaries and the number of the code set including the code defining the called destination is determined. This numerical relationship is then used to select the appropriate category of call treatment which should be accorded the particular call request.

BACKGROUND OF THE INVENTION

The call treatment translation and selection arrangement described herein is applicable to communication systems in which charging and routing treatments for communication services vary in accordance with the types of service available to a communication source and the location of a requested communication destination.

Different communication sources often are entitled to different types of communication services. The types of services may include restrictions upon the destinations to which communications can be transmitted, variations in the method of charging for the use of communication facilities, and other specialized communication services.

In communication systems, each customer station is assigned a class of service which identifies the particular communication services available to that station and the manner in which that customer station will be charged for those services. Requested communication destinations are defined by information codes generated by a calling station and received by a switching center. The route used when a call to a particular destination is requested may vary depending upon the class of service of the calling station. For example, if a calling station is not entitled to communicate with a requested destination, the call may be routed to an operator or a recorded announcement notifying the calling station that the call cannot be completed. Further, calls to a particular destination or group of destinations may be billed on a per call basis, on a fixed bulk charge basis or on some other special charging basis depending upon the class of service of the calling line.

Where $m$ classes of service are made available to stations served by a communication switching center, $n$ route patterns are provided to reach various call destinations and $p$ billing treatments are available, $mnp$ possible call treatments are defined. In order to select the proper route and charge treatment for any given call request, a translation must be performed based upon the class of service assigned to the calling station and the route pattern which is determined from the information code defining the location of the called station. Most modern communication switching systems employ a two-dimensional matrix-type selection arrangement to perform this translation. This matrix arrangement is in the form of wired logic relay-type selection circuits in electromechanical systems and in the form of translation tables stored in a random access bulk memory in program controlled electronic switching systems. Examples of such translation arrangements and their operation are described in the Bell Laboratories Record, volume 40, January 1962, page 12, in an article entitled "Class of Service Markings—What and Why" by Charles E. Brooks and in The Bell System Technical Journal, volume XLIII, September 1964, page 2533, in an article entitled "Translations in the No. 1 Electronic Switching System" by Ulrich and Vellenzer.

Where the two-dimensional matrix-type selection arrangement is employed, the amount of translation equipment (either relays and relay contacts or bulk memory translation table entries) increases rapidly either as new classes of service are added or as the number of available route patterns to a wider range of call destinations is increased. For example, in the No. 1 ESS arrangement described in the aforenoted Bell System Technical Journal article, a separate multiple entry route and charge table is provided in bulk memory for each class of service available in a telephone central office. Each route and charge table includes a separate entry for every route and charge treatment which can be accorded to calls originating from telephone lines having the class of service associated with the table. Thus, when the same route and charge treatment is used for calls from lines having different classes of service, the same route and charge entry must be provided in each one of the route and charge tables associated with those different classes of service. Each new class of service requires a complete new table. Each new route pattern requires corresponding entries in many tables. Considerable redundancy of entries results. The same redundancy occurs with respect to the relay contacts which must be provided in electromechanical route and charge treatment selection arrangements.

Since many new communication services have been offered and more will be offered in the future, and since automatic communication access is being given to an ever expanding range of call destinations, the matrix form of route and charge treatment selection is becoming extremely complex and very difficult to administer. Large amounts of equipment are required, and the expense of providing a complete range of communication services in any given switching center may well become prohibitive.

It is an object of this invention to reduce the amount of route and charge information which must be stored in bulk memory or wired logic to accommodate call treatment translations for the majority of new and existing communication services.

SUMMARY OF THE INVENTION

The above and other objects are accomplished in a specific illustrative embodiment of my invention which is described herein in the context of a telephone switching system. In accordance with the principles of the invention, information codes defining called destinations are organized into code sets according to basic categories of call treatment for various classes of service. These sets are numerically weighted and each is assigned numerical boundaries. For each class of service, the boundaries which define the limits for various categories of call treatment for call requests from lines having that class of service are defined with respect to the numerical weighting of the appropriate information code sets. The numerical relationship betwen the boundaries and the numerical weight of the code set including the code defining the called destination is determined. This numerical relationship is then used to select the appropriate call treatment category which should be accorded the particular call request.

Although the route and charge treatment accorded calls to various destinations from lines having various classes of service may differ considerably in terms of specific routes selected and specific charges applied, these various call treatments fall within a relatively few basic treatment categories. For example, many route and charge treatments can be allocated to one of three basic categories. The class of service assigned to a telephone line usually defines (1) those destinations to which calls can be made from the line without special charge, (2) those destinations to which calls can be made from the line on a special charge basis, and (3) those destinations to which calls from the line are not permitted. Thus, three basic call treatment categories are defined which are common to all such classes of service and to all destinations in various combinations; these categories are free, charge and deny.

The first or free call treatment category is represented by a request for a call to a destination which does not require that any special charges be made to the calling line. In this category, the call will be completed over a direct route associated with the called destination without any record being taken of the call for future automatic computation of charges for the call. The second or charge call treatment category is represented by a request for a call to a destination for which the calling line will be billed on a special charge basis. This category of call will be completed over a direct route associated with the called destination and a record of call information will be made on which will be based a future automatic computation of special charges to the calling line. The third or deny call treatment category is represented by a request for a call to a destination to which calls are not permitted from the calling line. In this category, the call will be routed to an operator or to an announcement without special charge to the calling line. It is to be understood, however, that the principles of my invention are not limited to the selection of one of three call treatment categories but are equally applicable where more than three categories are available to one class of service.

In accordance with the principles of my invention, the information codes which define all destinations to which calls can be directed from a telephone office are organized into a plurality of code groups and a plurality of code sets. The code groups vary in composition from one class of service to another. The code sets are the same for all classes of service. The criteria for this organization of information codes are described below.

For each class of service, all information codes which define destinations to which call requests from lines having that class of service are accorded the same basic category of call treatment are assigned to the same code group. Thus, for each class of service a separate code group is provided for each category of call treatment appropriate for call requests from lines having that class of service. As a result of this organization of information codes into code groups, each information code will be included in only one code group for each respective class of service.

Each of the code groups formed includes information codes which also are included in other code groups for different classes of service. However, the information codes included in any one code group for one class of service may be split between more than one code group for a different class of service. Where this split occurs, the smallest number of information codes in the one code group for the one class of service which are included in a signel code group for a different class of service is designated a code set. Application of this principle to all combinations of code groups for all classes of service results in the formation of many code sets. It should be noted that all information codes in each of the code sets formed are within only a single code group for any given class of service.

The information codes in each code set define various destinations to which calls can be directed from the telephone office. Since call route and charge treatments, upon which formulation of the code sets is based, usually are dependent upon approximate geographic location of the called destination with respect to the telephone office, the destinations defined by the respective code sets tend to be located in annular shaped zones each bounded by approximately concentric rings surrounding the telephone office. Each of these code set zones includes the destinations defined by the information codes included in a single code set.

In accordance with the principles of my invention, a number is assigned to each code set zone and to each zone boundary. These numbers are assigned in a sequence beginning at the telephone office and continuing through the outermost zone boundary. The numerical value of the code set zone in which a called destination is located can be determined by a direct translation of the information code defining the called destination.

For each class of service, the limits of each of the various code groups for that class of service can be defined numerically in terms of the boundaries of code set zones within the code group. These code group boundaries can then be determined by a direct translation of the class of service of a calling line.

The specific code group in which an information code is included for a given class of service can be determined by numerical comparisons between the numerical value of the code set zone including the information code and the numerical values of the zone boundaries which define the limits of the respective code groups. Since all of the needed values can be derived by direct translations of the information code defining the called destination and the class of service of the calling line, all the information necessary to determine the category of call treatment for a specific call request is available. Definition of the specific code group can be translated directly into the category of route and charge treatment to be accorded call requests from lines having that given class of service to the destination defined by the information code.

In accordance with my invention, an information code received as a call request from a calling line is translated into a code set zone number and a direct route identifier. The class of service of the calling line from which the information code was received is translated into code group boundary numbers. A boundary test number which defines the allocation of specific route and charge treatment categories to the respective code groups for that class of service is derived from the calling line's class of service. Each treatment category specifies a route identifier and a charge identifier appropriate to that category of call treatment. The zone number and the code group boundary numbers are compared to determine the specific code group to which the information code is assigned for the calling line's class of service. The identity of the code group including the information code specifies the proper category of call treatment to be accorded the call request from the calling line to the destination defined by the received information code. If a predetermined value is defined by the route identifier of the selected category of call treatment, the direct route identifier associated with the received information code will be used to determine the proper routing treatment. Otherwise, the routing treatment is derived from the route identifier specified by the selected call treatment category. The specific charge treatment is derived from the charge identifier specified by the selected call treatment category.

Since, as indicated previously herein, route and charge treatment category allocation is identical for different code groups for many classes of service, this allocation need be specified only once rather than many times as in the matrix-type translation arrangement. Accordingly, the number of separate entries which must be provided to accommodate route and charge treatment translations within a communication system is substantially reduced.

It is a feature of my invention that route and charge treatment selections are made in accordance with numerical comparisons of assigned designations which define for a plurality of classes of service and a plurality of called destination information codes the route and charge treatment categories which can be accorded call requests originated in a communication switching center.

DESCRIPTION OF THE DRAWING

The above and other objects and features of my invention will be more apparent from the following description when read with respect to the drawing, in which.

DETAILED DESCRIPTION

General description of the principles of my invention

Figure 1:
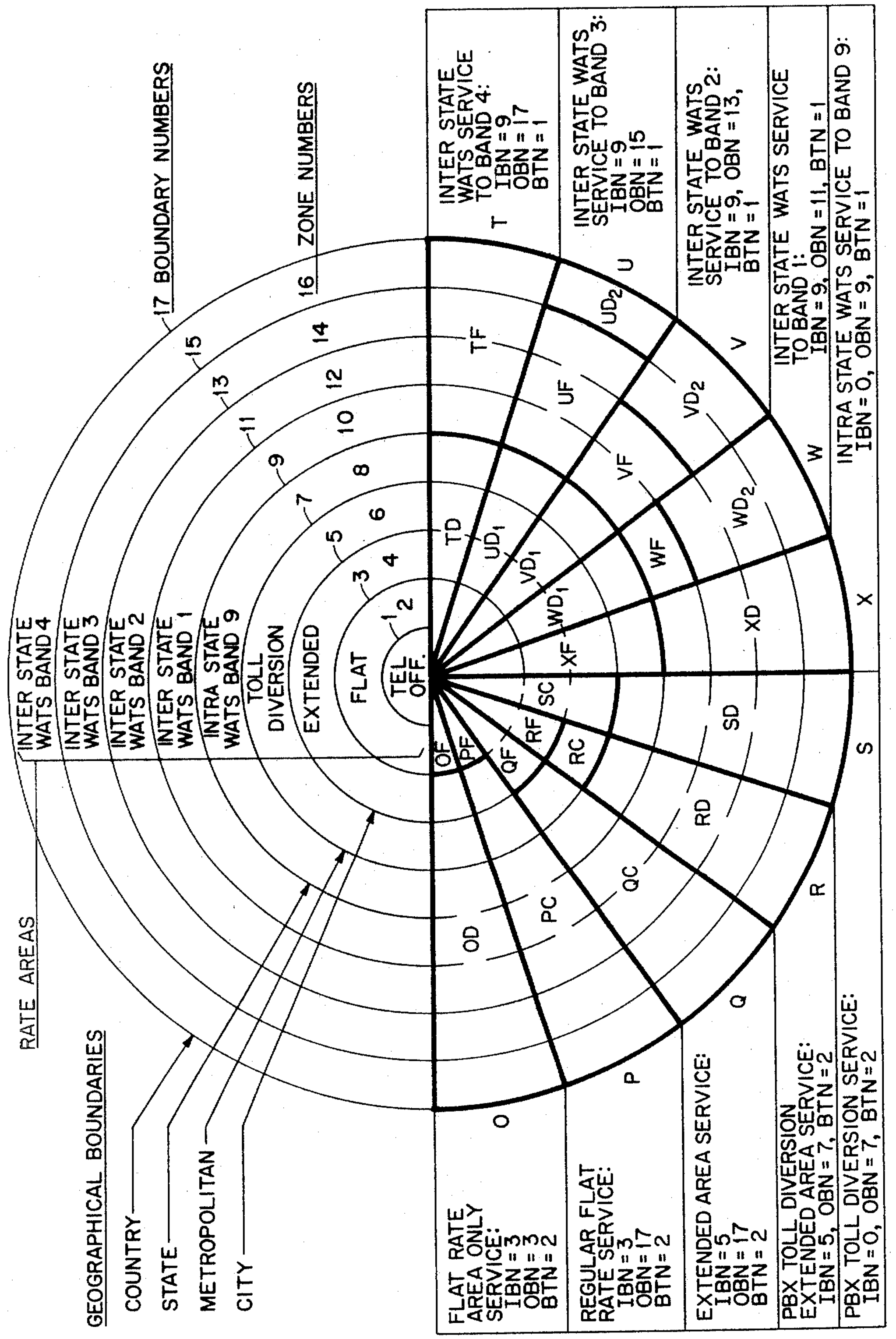
FIG. 1 represents diagrammatically an organization of a plurality of information codes and a plurality of classes of service into code groups and code sets in accordance with the principles of my invention.

FIG. 1 is a diagrammatic representation of an illustrative organization of information codes and classes of service in accordance with the principles of my invention. Each of a plurality of classes of service is represented in FIG. 1 by a sector O, P, Q, R, S, T, U, V, W and X. Each sector is defined by lines extending radially from a central point OFF representing a telephone office.

Within each class of service sector O through X, all available information codes are divided into a plurality of code groups. For example, class of service sector T is divided into two code groups TF and TD. As described earlier herein, a code group is comprised of those information codes defining destinations to which call requests from lines having a given class of service are accorded the same basic category of call treatment.

Each of the code group designations OD, OF, PC, PF, QC, QF, RD, RC, RF, SD, SC, XD, XF, WD1, WF, WD2, VD1, VF, VD2, UD1, UF, UD2, TD and TF includes two letters. The first letter indicates the class of service sector with which the code group is associated and the second letter indicates the applicable basic category of call treatment. For example, the designation TF indicates that code group TF is associated with class of service sector T and that the applicable call treatment category is F, which stands for free. The letter C denotes a charge category of call treatment. The letter D denotes a deny category of call treatment.

Since, as previously noted, call treatment usually is dependent upon geographical distance of the called destination from the telephone office, the dividing points between the code groups associated with a given class of service are linearly disposed along the radial lines which define the sector for that given class of service. For example, the division between code groups TD and TF is located approximately one-half the distance on the diagram of FIG. 1 from the centarl point OFF to the outer limit of class of service sector T. This does not necessarily represent an actual distance from the office OFF to call distinations. It merely represent a division of the available codes into call treatment categories. Each of these code groups dividing points for each class of service is represented in FIG. 1 by a concentric circle about point OFF passing through the point of division between the code groups associated with one class of service. For example, the concentric circle designated 9 represents the division between code groups TD and TF. Each concentric circle thus formed intersects all class of service sectors O through X. Each of the annular zones bounded by the concentric circles represents a code set, as defined earlier herein. From FIG. 1, it is evident that each code group includes one or more code sets.

A sequence of numbers 1–17 is assigned to the code set zones and to their concentric boundaries. The sequence starts at the central point OFF representing the telephone office and continues through the outermost concentric circle 17. FIG. 1 illustrates eight code set zones designated respectively 2, 4, 6, 8, 10, 12, 14 and 16 and nine code set zone boundaries designated respectively with boundary numbers 1, 3, 5, 7, 9, 11, 13, 15 and 17. Each code set zone generally defines a group of call destinations which fall within certain geographic limits. For illustrative purposes, the code set zones shown in FIG. 1 additionally have been labeled with descriptive designations representing various typical rate areas for particular classes of service. The numbered code set zone boundaries also have been designated in FIG. 1 with descriptive labels indicating their correspondence with illustrative geographical boundaries which are typical of communication system route and charge area boundaries.

In FIG. 1, each class of service sector O through X is identified with a descriptive designation defining the services available to lines having the class of service represented by that sector. For example, class of service sector O represents a flat rate only service which permits calling lines to call only destinations within the flat rate area zone 2. Class of service S represents a PBX toll diversion service which permits calling lines to call destinations within the flat rate area zone 2, within the extended area zone 4 and within the toll diversion area zone 6 on a special charge basis but which prohibits calls to any other destinations. Class of service U represents an interstate WATS service which permits a calling line to call destinations within interstate WATS bands 1, 2 and 3 which correspond to code set zones 10, 12 and 14 without special charge but which prohilits calls to any other destinations.

The following table explains the allocation of code groups for the classes of service illustrated in FIG. 1.

| Class of service | Code group | Treatment category | Route | Charge |
|---|---|---|---|---|
| O | OF | Free | Direct | No record. |
| | OD | Denied | Operator | Do. |
| P | PF | Free | Direct | Do. |
| | PC | Charge | do | Call record. |
| Q | QF | Free | do | No record. |
| | QC | Charge | do | Call record. |
| R | RF | Free | do | No record. |
| | RC | Charge | do | Call record. |
| | RD | Denied | Operator | No record. |
| S | SC | Charge | Direct | Call record. |
| | SD | Denied | Operator | No record. |
| T | TD | do | do | Do. |
| | TF | Free | Direct | Do. |
| U | UD1 | Denied | Operator | Do. |
| | UF | Free | Direct | Do. |
| | UD2 | Denied | Operator | Do. |
| V | VD1 | do | do | Do. |
| | VF | Free | Direct | Do. |
| | VD2 | Denied | Operator | Do. |
| W | WD1 | do | do | Do. |
| | WF | Free | Direct | Do. |
| | WD2 | Denied | Operator | Do. |
| X | XF2 | Free | Direct | Do. |
| | XD | Denied | Operator | Do. |

Although a maximum of three code groups are represented in FIG. 1 for each class of service for illustrative purposes, any number of code groups can be formed for a given class of service.

Each code group shown in FIG. 1 is defined by the code set zones of which the code group is comprised in combination with the class of service sector of which the code group is a part. For example, code group TF is defined by class of service sector T and the code set zones numbered 10, 12, 14 and 16. The limits of each code group are defined by the code set zone boundaries of the innermost and outermost code set zones intersecting the class of service sector within the code group area. The inner boundary of the innermost code set zone in the code group corresponds to the inner boundary of the code group. For example, zone boundary 9 represents the inner boundary number IBN of code group TF. The outer boundary of the outermost code set zone in the code group corresponds to the outer boundary of the code group. For example, zone boundary 17 represents the outer boundary number OBN of code group TF. Thus, there is a direct correspondence between each class of service and the inner and outer boundary numbers IBN and OBN which define the limits of the respective code groups associated with that class of service. This direct correspondence of IBN and OBN to each class of service is part of the translation information stored or wired in the call treatment translation arrangement of the present invention.

Since each possible information code is included within only one code set, there is a direct correspondence between any given information code and the code set zone number ZN for the code set including that information code. This direct correspondence of a zone number ZN to each information code also is part of the translation information stored or wired in the call treatment translation arrangement of this invention.

A direct translation of a called information code will ascertain the number ZN of the code set zone in which the called information code is included. A direct translation of the class of service of a calling line will ascertain the numbers IBN and OBN of the inner and outer boundaries of the code groups for that class of service. An arithmetic comparison of the code set zone number ZN and the code group boundary numbers IBN and OBN will indicate the particular code group within which the called information code is included.

FIG. 1 and the table presented earlier herein illustrate the fact that three or less code groups are associated with each of the majority of classes of service. Thus, where three code groups are formed, a comparison of the code set zone number ZN of a called information code with the boundary numbers IBN and OBN of the middle code group for the calling line's class of service will indicate the particular code group in which the called information code is included. If the code set zone number ZN is greater than the outer boundary number OBN of the middle code group, the information code falls within the outermost code group. If the code set zone number ZN is less than the inner boundary number IBN of the middle code group, the called information code falls within the innermost code group. If neither of the above is true, the called information code must be included in the middle code group.

For example, it is assumed that the class of service of a calling line is represented by sector R. The inner and outer boundary numbers IBN and OBN of code group RC are respectively 5 and 7, as indicated in FIG. 1. If the code set zone number ZN for the called information code is less than 5, the called information code is in code group RF. If the zone number ZN is greater than 7, the called information code falls within code group RD. If neither of the above relationships exists, the called information code is within code group RC. Thus, a simple arithmetic comparison can be used to determine the code group in which any called information code is included. If more than three code groups are formed for one class of service, additional comparisons may be necessary to determine the proper code group.

In FIG. 1, each of the class of service sectors O through X is labeled with the code set zone boundary numbers IBN and OBN which define the boundaries of a code group for that class of service. For example, class of service sector R is labeled with IBN=5 and OBN=7. These boundary numbers define the inner and outer limits of code group RC.

Also defined in FIG. 1 for each class of service sector O through X is a boundary test number BTN. This number BTN represents the allocation of a specific call treatment category to each code group for that class of service. When the code group which includes a received information code has been determined by means of the aforenoted arithmetic comparison, the boundary test number BTN serves as the basis for selecting the specific category of call treatment corresponding to that code group. The following table illustrates a few call treatment category allocations by boundary test number BTN in terms of numerical relationships between code group boundary numbers IBN and OBN and code set zone numbers ZN. Only the first two of the boundary test numbers in the table are used in the illustrative organization shown in FIG. 1.

| | ZN less than IBN | ZN between IBN and OBN | ZN greater than OBN |
|---|---|---|---|
| Boundary test number: | | | |
| 1 | Denied | Free | Denied. |
| 2 | Free | Charge | Do. |
| 3 | Charge | Free | Charge. |

For example, the boundary test number BTN shown on FIG. 1 for class of service sector R is 2. The inner and outer boundary numbers IBN and OBN shown on FIG. 1 for sector R are 5 and 7, respectively. If the code set zone number ZN for the called information code is less than 5, the call is in the free category and will be completed over a direct route without charge. If the zone number ZN is between 5 and 7, the call is in the charge category and will be completed over a direct route on a special charge basis. A record of call information will be taken upon which to base future billing charges. If the zone number ZN is greater than 7, the call is in the denied category and will be routed to an operator without special charge, As another example, the number BTN shown on FIG. 1 for class of service sector U is 1. The inner and outer boundary indicators IBN and OBN specified for sector U are 9 and 15, respectively, which define the limits of code group UF. If the zone number ZN for the called information code is less than 9, the call is in the denied category and will be routed to an operator without charge. If the zone number ZN for the called information code is between 9 and 15, the call is in the free category and will be completed over a direct route without charge. If the zone number ZN for the called information code is greater than 15, the call is in the denied category and will be routed to an operator without charge. Thus, a numerical comparison between specified inner and outer boundary numbers IBN and OBN and the code set zone number ZN for a called information code defines the category of call treatment to be accorded a particular call request.

It should be noted that the ten classes of service represented on FIG. 1 require only two boundary test entries to define all applicable allocations of call treatment categories. In the aforenoted matrix-type selection arrangement, a substantially greater number of call treatment entries would be required.

DESCRIPTION OF PROGRAM CONTROLLED EMBODIMENT

Figure 2:
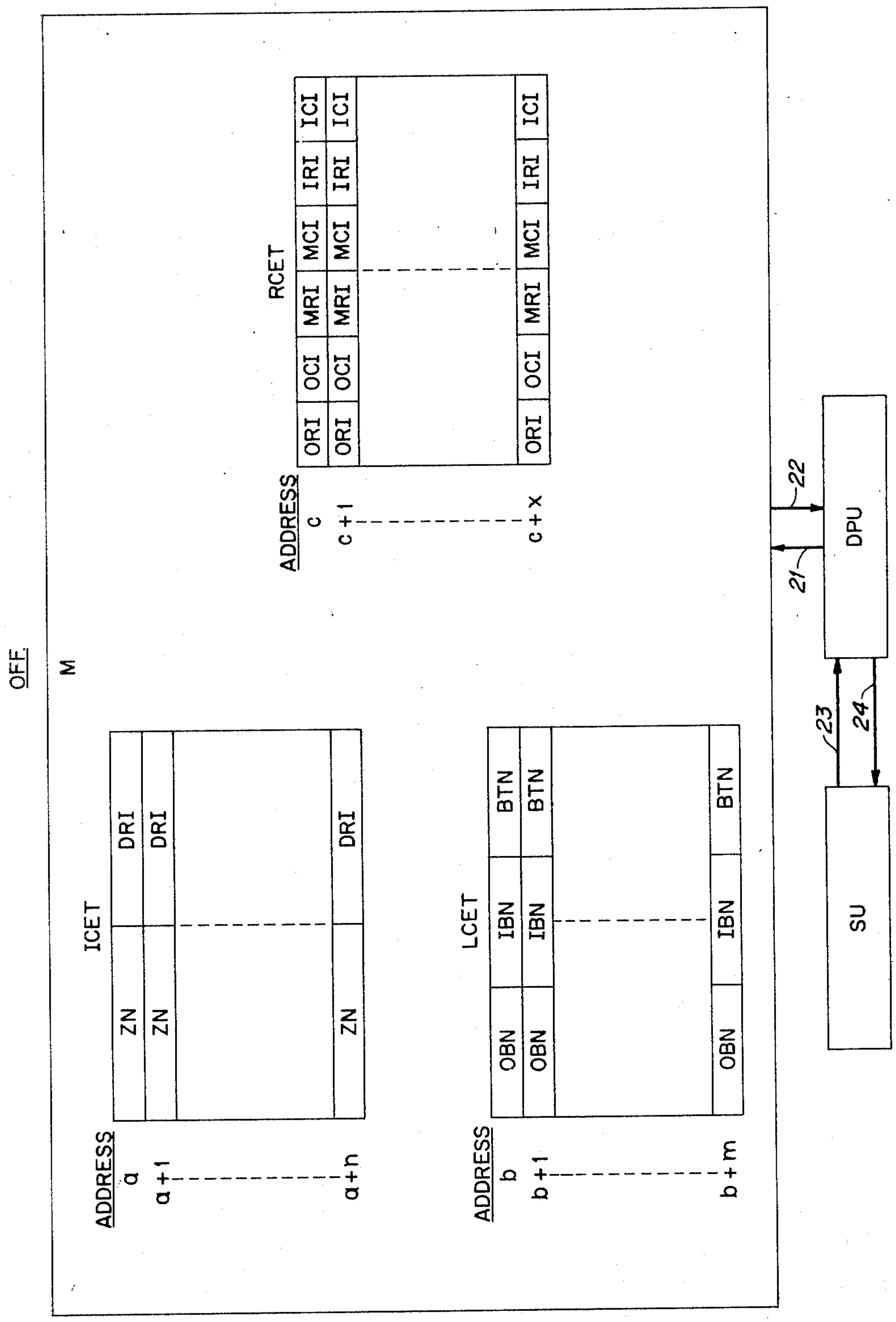
FIG. 2 illustrates one illustrative embodiment of my invention as implemented by translation tables in bulk memory for a program controlled communication switching system.

FIG. 2 represents a communication switching office OFF which includes a program controlled data processing arrangement comprising a data processing unit DPU, a bulk memory M, and a communication switching unit SU. The use of program controlled data processors to control the operations of communication switching systems is now well known in the communication art. Accordingly, no detailed description of either processor DPU, memory M, or the controlled switching arrangement SU will be given herein other than to set forth the necessary memory organization and processor operations required to implement the invention.

Each of the operation sequences performed by processor DPU for purposes of implementing my invention is within the capability of any general purpose computer.

Each of these sequences will be described only in terms of function and only in sufficient detail to provide an understanding of this invention.

Memory M is a word-organized random access bulk memory. Each word stored in memory M is identified by an address specifying its storage location. Information is fetched from memory M by processor DPU by transmitting the address of the desired word from processor DPU to memory M over channel 21 in response to which the word stored in the location defined by the transmitted address is transmitted from memory M to processor DPU over channel 22.

For purposes of call treatment translation, memory M contains an information code expansion table ICET, a line class expansion table LCET and a route and charge treatment category expansion table RCET. Table ICET includes $n$ ICET words located respectively at addresses $a$ through $a+n$. Table LCET contains $m$ LCET words located respectively at addresses $b$ through $b+m$. Table RCET contains $x$ RCET words located respectively at addresses $c$ through $c+x$.

It is assumed that $n$ possible information codes can be generated by stations served by the switching unit SU of telephone office OFF shown in FIG. 2. Table ICET includes one ICET word located respectively at addresses $a$ through $a+n$ for each of these $n$ information codes. Each ICET word includes a zone number portion ZN and a direct route identifier portion DRI. The ZN portion defines the number of the code set zone which includes the information code associated with that particular ICET word. The DRI portion defines the direct route from the telephone office OFF to the destination defined by the information code associated with the ICET word. An information code generated by a calling line and received over channel 24 by processor DPU can be used directly by processor DPU to identify the address ($a$ through $a+n$) of the ICET word corresponding to the received information code.

It is assumed that the telephone office OFF controlled by the arrangement shown in FIG. 2 can provide $m$ classes of service to lines served by the office. Table LCET includes a separate LCET word located respectively at addresses $b$ through $b+m$ for each of the $m$ classes of service. Each LCET word contains three portions which are: outer boundary number OBN, inner boundary number IBN and boundary test number BTN. The OBN portion defines the number of the outer boundary of one code group for the class of service to which the LCET word corresponds. The IBN portion defines the inner boundary number of the same code group. The BTN portion identifies the address ($c$ through $c+x$) of the particular RCET word in the RCET table which defines the allocation of call treatment categories for the class of service corresponding to the LCET word.

It is assumed that $x$ different combinations of call treatment categories are required for call requests to the destinations which can be reached from the telephone office OFF controlled by the arrangement in FIG. 2. Table RCET contains a separate RCET word located respectively at addresses $c$ through $c+x$ for each different combination of call treatment categories. Each word contains six portions which are: outer route index ORI, outer charge index OCI, middle route index MRI, middle charge index MCI, inner route index IRI and inner charge index ICI. As described earlier herein, the call treatment accorded the middle code group for one class of service may well be identical to the call treatment accorded the outermost code group for another class of service or the innermost code group of still another class of service. Accordingly, the ORI portion for one RCET word may be identical to the MRI portion of another RCET word and to the IRI portion of still another RCET word. Similarly, the same information may appear in the OCI, MCI and ICI portions of the same or different LCET words. The information in the ORI, MRI and IRI portions of the respective RCET words defines various special route treatments which are applicable to calls originated from the telephone office. In addition, the information in any ORI, MRI or IRI portion of an RCET word can refer back to the direct route identifier DRI defined by the ICET word corresponding to the call information code. This is accomplished by a predetermined value being entered in the appropriate ORI, MRI or IRI word portion. Detection of this predetermined value by processor DPU causes the DRI from the ICET word corresponding to the called information code to be used.

As is well known in the art, the called information code and the class of service of the calling line are ascertained by scanning or other supervisory arrangements of the switching system and serve as input information to processor DPU. An outline is presented below in which the major items (designated with Arabic numerals) describe the broad functional steps taken to implement the principles of this invention. The subheadings (designated with lower case letters) break down the functional steps into data processing sequences performed by processor DPU. As noted earlier, each of the sequences is within the properly programmed capability of any general purpose computer.

(1) Translate the information code generated by a calling line into the designation of the code set which includes the generated information code.

(a) Read memory M at the address indicated by the generated information code to fetch the corresponding ICET word.

(b) Store the fetched ICET word including ZN and DRI in processor DPU.

(2) Translate the class of service of the calling line into the designations of the code set dividing points which separate the respective code groups for the calling line's class of service.

(a) Read memory M at the address indicated by the class of service of the calling line to fetch the corresponding LCET word.

(b) Store the fetched LCET word including OBN, IBN and BTN in processor DPU.

(3) Determine the sequential relationship between the code set designation derived in step (1) and the dividing point designations derived in step (2).

(a) Determine if ZN is less than IBN; if yes, raise a first flag and go to step (4); if no, proceed to step (3b).

(b) Determine if ZN is greater than OBN; if yes, raise a second flag and go to step (4); if no, raise a third flag and go to step (4).

(4) In accordance with the sequential relationship determined in step (3), select one of the plurality of categories of route and charge treatments available to communication requests from the calling line.

(a) Using BTN (fetched in step (2c)) as an address, read memory M to fetch the RCET word appropriate to the calling line's class of service.

(b) Store fetched RCET word including ORI, OCI, MRI, MCI, IRI and ICI in processor DPU.

(c) If first flag is raised (step (3a)), examine IRI of stored RCET word for all 0's; or if second flag is raised (step (3b)), examine ORI of stored RCET word for all 0's; or if third flag is raised (step (3b)), examine MRI of RCET word for all 0's.

(d) If all 0's are detected in step (4c) and first flag is raised, select DRI (fetched in step (1b)) and ICI; or if all 0's are detected in step (4c) and second flag is raised, select DRI and OCI; or if all 0's are detected in step (4c) and third flag is raised, select DRI and MCI; or if all 0's are not detected in step (4c) and first flag is raised, select IRI and ICI; or if all 0's are not detected in step (4c) and second flag is raised, select ORI and OCI; or if all 0's are not detected in step (4c) and third flag is raised, select MRI and MCI.

For purposes of illustration it will be assumed that a calling line having interstate WATS service to band 2 (class of service sector V in FIG. 1) requests a call to a destination in intrastate WATS band 9. The information code generated by the calling line is received over channel 23 by processor DPU from switch unit SU. It is assumed that the received information code corresponds to address $a+1$ in memory M. Address $a+1$ is transmitted from processor DPU over channel 21 to memory M. The ICET word at address $a+1$ is transmitted from memory M over channel 22 to processor DPU. The ZN and DRI portions of the fetched ICET word are stored in processor DPU.

The class of service of the calling line is assumed to correspond with address $b+1$ in memory M. Address $b+1$ is transmitted over channel 21 to memory M and the LCET word located at address $b+1$ is transmitted from memory M over channel 22 to processor DPU. The OBN, IBN and BTN portions of the fetched LCET word are stored in processor DPU.

Referring to FIG. 1, it can be observed that the class of service of the calling line (interstate WATS service to band 2) is associated with class of service sector V. The inner and outer boundary numbers IBN and OBN of the middle code group VF in sector V are 9 and 13, respectively. Accordingly, the OBN portion of the fetched LCET word is equal to 13 and the IBN portion is equal to 9. In accordance with the assumptions made above, the information code generated by the calling line is included within code set zone 8 (intrastate WATS band 9). Accordingly, the ZN portion of the fetched ICET word is equal to 8.

Processor DPU now makes a numerical comparison between the ZN portion of the stored ICET word and the IBN portion of the stored LCET word. If the ZN is less than the IBN, a flag is raised in processor DPU by conditioning an appropriate indicator. Since the ZN (8) is less than the IBN (9) in the illustration being described, conditioning of the appropriate indicator occurs in processor DPU.

The boundary test number BTN indicated for sector V is 1. The BTN portion of the stored LCET word defines the address of the RCET word identifying the allocation of call treatment categories for boundary test 1. It should be noted that only two boundary tests and therefore only two RCET words are required to define all the allocations of call treatment categories for the ten classes of service illustrated in FIG. 1.

It is assumed that the BTN portion of the stored LCET word defines address $c$ which is the address of the first RCET word in the RCET table within memory M. The address $c$ is transmitted over channel 21 from processor DPU to memory M and the RCET word at address $c$ is transmitted from memory M over channel 22 to processor DPU. The fetched RCET word is stored in processor DPU.

Since an indication is present in processor DPU that the ZN of the stored ICET word is less than the IBN of the stored LCET word, processor DPU examines the IRI portion of the stored RCET word to ascertain if it contains all 0's. In the illustration being described, the IRI portion of the stored RCET word does not contain all 0's. As indicated on FIG. 1 and as shown in the table presented earlier herein, calls are not permitted to destinations identified by information codes belonging to code sets whose number is less than the inner boundary number of the middle code group from lines having a class of service assigned a boundary test number BTN equal to 1. Therefore, the IRI portion of the stored RCET word will specify a route to an operator or other destination which will indicate that the call cannot be completed.

Since all 0's are not detected in the IRI portion of the stored RCET word, processor DPU will select the IRI and ICI portions as defining the appropriate category of call treatment to be given the request from the calling line. In the illustration described, the call request falls into the denied call treatment category and the calling line will be connected without special charge to an operator.

The specific program necessary to implement the above functional sequences will vary depending upon the organization and order structure of the computer used for processor DPU. The functional sequences described above can be programmed for any appropriate stored program control unit by a person skilled in that art.

Description of wired logic embodiment

Figure 3:
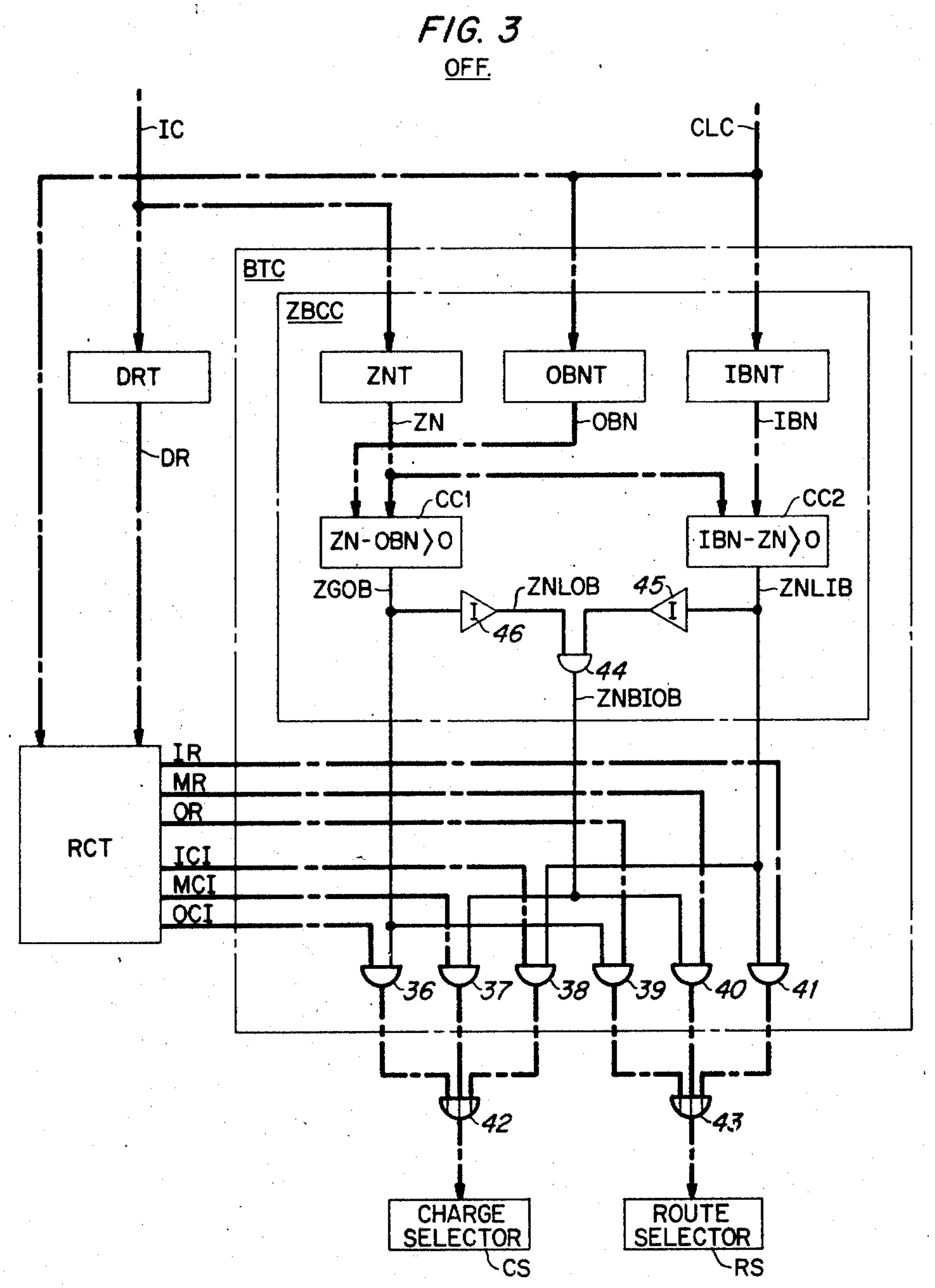
FIG. 3 represents a second illustrative embodiment of my invention as implemented by wired logic.

FIG. 3 illustrates a wired logic arrangement for implementing the method of call treatment translation in accordance with the principles of my invention in a communication switching office OFF. Each of the blocks shown in FIG. 3 represents circuit logic which is described functionally herein and which is well known in the art of logic design. Since the details of the circuitry represented in block diagram form on FIG. 3 are not necessary to an understanding of the invention, no detailed description thereof is presented herein.

Zone number translator ZNT is a wired logic translator which receives as an input over cable IC the information code generated by a calling line. The output of translator ZNT on cable ZN is a representation of the zone number of the code set which includes the generated information code.

Outer boundary number translator OBNT is a wired logic arrangement whose input over cable CLC is a representation of the class of service of the calling line which generated the aforenoted information code. The output of translator OBNT on cable OBN is a representation of the outer boundary number for the middle code group associated with the class of service of the calling line.

Inner boundary number translator IBNT also receives as an input over cable CLC the class of service of the calling line. The output of translator IBNT on cable IBN is a representation of the inner boundary number of the middle code group for the class of service of the calling line.

Direct route translator DRT is a wired logic arrangement which receives as an input over cable IC the information code generated by the calling line. The output of translator DRT on cable DR defines the direct route from the telephone office OFF to the destination defined by the generated information code.

Route and charge translator RCT also is a wired logic arrangement which receives as input information over cable CLC the class of service of the calling line and the direct route information provided by translator DRT on cable DR. The outputs of translator RCT are representations of an inner route on cable IR, a middle route on cable MR, an outer route on cable OR, an inner charge indicator on cable ICI, a middle charge indicator on cable MCI and an outer charge indicator on cable OCI. The direct route information received on cable DR can be transmitted by translator RCT to any one or more of its output cables IR, MR or OR depending upon the class of service of the calling line. Since, as discussed earlier herein, many classes of service provide identical allocations of call treatment categories, the logic circuitry employed in translator RCT is less redundant that the logic arrangements currently employed to define specific call treatment information for each individual class of service.

Comparison circuit CC1 receives as input information the zone number and the outer boundary number over cables ZN and OBN from translators ZNT and OBNT. As indicated by the function defined within the block labeled CC1, a determination is made by comparison circuit CC1 if, when the outer boundary number is subtracted from the zone number, the resulting difference is greater than 0. If the result is greater than 0, an output is provided on conductor ZGOB to indicate that the zone number is greater than the outer boundary number. This type of comparison circuit and 0 detection arrangement is well known in the art and therefore is not described in detail herein.

Comparison circuit CC2 also is a subtraction and 0 detection logic arrangement. The function performed by comparison circuit CC2 is indicated by the expression within the block representing comparison circuit CC2. If when the zone number is subtracted from the inner boundary number the resulting difference is greater than 0, an output is provided by comparison circuit CC2 on conductor ZNLIB. This output indicates that the zone number is less than the inner boundary number.

Inverters 45 and 46 will cause AND gate 44 to be enabled in the event that neither of the comparison circuits CC1 and CC2 provides signals on their respective output conductors ZGOB and ZNLIB. When AND gate 44 is enabled, a signal is placed on conductor ZNBIOB indicating that the zone number is numerically between the inner boundary number and the outer boundary number.

Each of the symbolic AND gates 36, 37, 38, 39, 40 and 41 represents a plurality of AND gates equivalent in number to the number of conductors provided in the respective cables OCI, MCI, ICI, OR, MR and IR connected to the symbolic AND gates 36–41. All of the AND gates represented by each of the symbolic AND gates 36–41 are enabled by the conductor connected to the symbolic AND gate. For example, symbolic AND gate 36 represents a plurality of AND gates equal in number to the conductors contained in cable OCI. All of the AND gates represented by symbolic AND gate 36 are enabled simultaneously in response to a signal on conductor ZGOB.

Only one of the output conductors ZGOB, ZNBIOB, ZNLIB from zone boundary comparison circuit ZBCC will be energized at any given time. The energized output conductor from comparison circuit ZBCC defines the code group in which the generated information code is included for the class of service of the calling line. Selection of call treatment category is based upon the defined code group. If conductor ZGOB is energized, indicating that the outer code group is appropriate, information defining the outer route will be gated from cable OR through symbolic AND gate 39 to route selector RS and information defining the outer charge indicator will be gated from cable OCI through symbolic AND gate 36 to charge selector CS. If conductor ZNLIB is energized, indicating that the inner code group is appropriate, information defining the inner route will be gated from cable IR through symbolic AND gate 41 to route selector RS and information defining the inner charge indicator will be gated from cable ICI through symbolic AND gate 38 to charge selector CS. Similarly, if conductor ZNBIOB is energized, indicating that the middle code group is appropriate, information defining the middle route will be gated from cable MR through AND gate 40 to route selector RS and information defining the middle charge indicator will be gated from cable MCI through symbolic AND gate 37 to charge selector CS. It should be recalled that the direct route information on cable DR may appear on any of the translator RCT output cables IR, MR or OR depending upon the calling line's class of service. The direct route information will be gated to route selector RS as described above if the proper code group is indicated by zone boundary comparison circuit ZBCC.

The wired logic arrangement depicted in FIG. 3 performs the translation of a generated information code and the class of service of a calling line into information defining the category of call treatment to be accorded the request from the calling line by performing the same basic functional steps previously described with respect to the program controlled data processing arrangement of FIG. 2.

The sequence of numbers whose comparison serves as the basis for determining the category of call treatment to be accorded a call request can also be limited to only the code set zones, thus omitting the designations given to the zone boundaries. If this is done, the inner boundary and outer boundary of a code group can be respectively defined by the zone number ZN assigned to the innermost and outermost code set zones within the code group. The comparison function in this organization of information codes would then determine (1) if the zone number derived from an information code is less than but not equal to the inner boundary number and (2) if the zone number derived from the information code is greater than but not equal to the outer boundary number. Other numerical designation techniques can be employed to define the boundaries of a code group. The comparison functions required to determine which specific code group includes an information code will depend upon the designation technique employed.

It is understood that the above-described arrangements are merely illustrative of the application of the principles of my invention. Numerous other arrangements may be devised by those skilled in the art without departing from the spirit and scope of the invention.

What is claimed is:

1. In a communication switching arrangement wherein:

each of a plurality of lines served by said switching arrangement is assigned one of a plurality of classes of service defining the communication services to which said line is entitled, each of a plurality of destinations with which said lines selectively communicate through and under control of said switching arrangement is defined by a discrete information code, said codes are organized into a plurality of code groups for each of said classes of service, each said code group including only those codes defining destinations to which communication requests from lines having one class of service are treated similarly by said switching arrangement for route and charge purposes, said codes are divided into code sets, each said code set being identical for all said classes of service and including codes which all are within one said code group for each said class of service, and said code sets are each assigned one of a sequence of designations, the method of selecting the route and charge treatment to be accorded a communication request from a calling line to a destination defined by an information code generated by said calling line comprising the following steps:

(1) translating said generated information code into the designation from said sequence of the code set including said generated information code;

(2) translating the class of service assigned to said calling line into the designations from said sequence which define the boundaries of the code groups for said calling line's class of service;

(3) determining the sequential relationship between the designations derived in steps (1) and (2);

(4) in accordance with the sequential relationship determined in step (3), selecting one of a plurality of route and charge treatments available to communication requests from said calling line.

2. In a communciation switching arrangement according to claim 1 wherein communications between said lines and said destinations are established by said switching arrangement via transmission routes selected by said switching arrangement in accordance with the information codes generated by calling ones of said lines, the method of claim 1 further comprising the following steps:

(5) translating said generated information code into a route identifier which defines the direct route between said calling line and the destination defined by said generated information code;

(6) examining the selected route treatment for a predetermined characteristic;

(7) selecting said direct route as defined by said route identifier if said predetermined characteristic is detected in step (6).

3. In a communication switching arrangement wherein:

each of a plurality of lines served by said switching arrangement is assigned one of a plurality of classes of service defining the communication services to which said line is entitled.

each of a plurality of destinations with which said lines selectively communicate through and under control of said switching arrangement is defined by a discrete information code, said codes are organized into a plurality of code groups for each of said classes of service, each said code group including only those codes defining destinations to which communication requests from lines having one class of service are treated similarly by said switching arrangement for route and charge purposes, said codes are divided into code sets, each said code set being identical for all classes of service and including codes which all are within one said code group for each said class of service, and said code sets and the dividing points therebetween are each assigned one of a sequence of designations, the method of selecting the route and charge treatment to be accorded a communication request from a calling line to a destination defined by an information code generated by said calling line comprising the following steps:

(1) translating said generated information code into the designation from said sequence of the code set including said generated information code;

(2) translating the class of service assigned to said calling line into the designations from said sequence of the code set dividing points which separate the code groups for said calling line's class of service;

(3) determining the sequential relationship between the code set designation derived in step (1) and the dividing point designations derived in step (2); and (4) in accordance with the sequential relationship determined in step (3), selecting one of a plurality of route and charge treatments available to communication requests from said calling line.

4. In a communication switching arrangement according to claim 3, the method of claim 3 wherein step (4) comprises the following steps:

(4a) translating said class of service assigned to said calling line into said plurality of route and charge treatments available to communication requests from said calling line;

(4b) in accordance with the sequential relationship determined in step (3) selecting one of said route and charge treatments derived in step (4a).

5. In a communication switching arrangement according to claim 4, the method of claim 4 further comprising the following steps:

(5) translating said generated information code into a route identifier which defines a communication route between said calling line and the destination defined by said generated information code;

(6) examining the route treatment selected in step (4b) for a predetermined characteristic;

(7) selecting said route defined by said route identifier if said predetermined characteristic is detected in step (6).

6. In a communication switching system wherein a plurality of lines are served by a switching office, wherein each line is assigned a class of service, and wherein other offices to which calls can be directed from these lines are located in zones with each zone being defined by an inner boundary number, an outer boundary number, and a zone number falling between the inner and outer boundary numbers, the combination including:

means responsive to call information from a line defining one of the other offices and to information defining the class of service of the calling line for deriving the zone number of the zone including the called other office, the inner boundary number of one of the zones, and the outer boundary number of one of the zones;

means for determining the numerical relationship between said derived numbers and for providing control information defining said determined relationship; and means controlled by said control information, said call information and said class of service information for determining the routing and charging treatment to be accorded said service request from said calling line.

7. In a communication switching system the combination in accordance with claim 6 wherein said means for determining the numerical relationship between said derived numbers and for providing control information includes means for determining whether said zone number is larger than said outer boundary number and for determining whether said zone number is smaller than said inner boundary number.

8. In a communication switching system wherein:

a plurality of zones surround a switching office, each zone including at least one other switching office and each zone defined by an inner boundary and an outer boundary, and wherein a plurality of lines are served by the switching office, each line being assigned a class of service which defines those zones to which calls are permitted from the line and those zones to which calls are permitted without charge from the line;

said switching office comprising:

means responsive to call request information defining a called one of said other offices received from a calling one of said lines for deriving a zone identifier identifying the zone in which said called other office is located;

means responsive to information defining the class of service assigned to said calling line for deriving an inner boundary identifier identifying the inner boundary of one of said zones and an outer boundary identifier identifying the outer boundary of one of said zones;

means controlled in accordance with said derived identifiers for determining if said identified zone is between said identified inner boundary and said identified outer boundary, if said identified zone is beyond said identified outer boundary with respect to said switching office, and if said identified zone is between said switching office and said identified inner boundary; and means controlled in accordance with said class of service information and by said determining means for indicating if said calling line is permitted to place a call to said called other office, if a charge is to be made for a call from said calling line to said called other office, and the route over which communication with said calling line will be established.

9. In a communication switching system wherein:

a plurality of zones surround a switching office, each zone including at least one other switching office and each zone defined by a numerically designated inner boundary, a numerically designated outer boundary and a zone number falling between the inner and outer boundary designations, and wherein a plurality of lines are served by the switching office, each line being assigned a class of service defining routing and charging information for call requests originated over said line, the routing and charging information defining those zones to which calls are permitted from the line and those zones to which calls are permitted without charge from the line;

said switching office comprising:

means responsive to call information defining a called one of said other offices received from a calling one of said lines for deriving the zone number which identifies the zone in which said called other office is located;

means responsive to information defining the class of service assigned to said calling line for deriving the inner boundary designation of one of said zones and the outer boundary designation of the same or another of said zones;

means for determining if said derived zone number is numerically between said derived inner and outer boundary designations, if said derived zone number is greater than said derived outer boundary designation, and if said derived zone number is less than said derived inner boundary designation; and means controlled in accordance with said class of service information and by said determining means for indicating if said calling line is permitted to place a call to said called other office, if a charge is to be made for a call from said calling line to said called other office, and the communication route over which communication will be established with said calling line.

No references cited.

WILLIAM C. COOPER, Primary Examiner